(No Model.)
H. NICKOLDS, Sr.
SPOON BOWL.
No. 305,839. Patented Sept. 30, 1884.
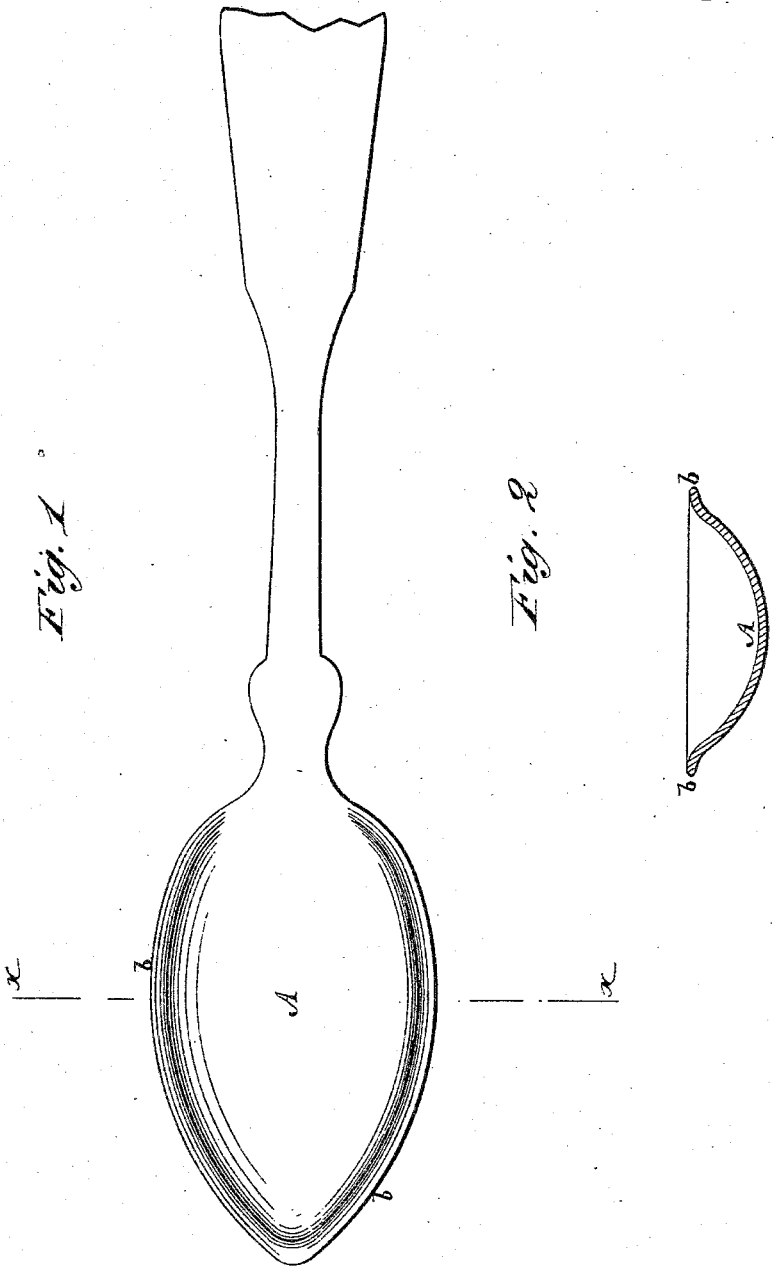
WITNESSES:
C. Neveux
C. Sedgwick
INVENTOR:
H. Nickolds Sr
BY Munn & Co
ATTORNEYS.

UNITED STATES PATENT OFFICE.

HENRY NICKOLDS, SR., OF TAUNTON, MASSACHUSETTS.

SPOON-BOWL.

SPECIFICATION forming part of Letters Patent No. 305,839, dated September 30, 1884.

Application filed March 31, 1884. (No model.)

*To all whom it may concern:*

Be it known that I, HENRY NICKOLDS, Sr., of Taunton, in the county of Bristol and State of Massachusetts, have invented a new and Improved Spoon-Bowl, of which the following is a full, clear, and exact description.

This invention, which is applicable to spoons generally, irrespective of the material of which they are made, but more particularly to tea, dessert, and other spoons used to convey food and other substances or liquids to the mouth, consists in a novel construction of the bowl of the spoon, which, instead of having a sharp edge, as usual, formed by a direct continuation of the contour of the bowl, has its margin bent outward or extended in the manner of a flange, or, in other words, made with a returned edge, whereby numerous advantages are obtained, substantially as hereinafter described.

Reference is to be had to the accompanying drawings, forming a part of this specification, in which similar letters of reference indicate corresponding parts in both the figures.

Figure 1 represents a top or face view of a spoon in part having a bowl constructed in accordance with my invention, and Fig. 2 is a transverse section of the same on the line $x\ x$ in Fig. 1.

A indicates the bowl of the spoon, the upper margin of which is bent outward or extended, forming a flange or returned edge, $b$, arranged to extend all around the bowl, but vanishing in the rear where the bowl joins the handle. A spoon-bowl thus constructed with a returned edge, $b$, does away with that cutting and abrupt effect which is incidental to a marginal finish formed by a direct continuation of the contour of the bowl, and presents a very smooth and agreeable surface to the upper lip, thereby preventing that disagreeable effect which is produced by the chafing of the tender skin of the upper lip with the edge of the bowl, as usually experienced in the use of ordinary spoons. Such returned edge, too, strengthens the bowl much more than a larger amount of metal would do as ordinary spoon-bowls are shaped or constructed. The lateral configuration of the edge of the bowl is likewise improved. A spoon having its bowl thus made will be found greatly more agreeable in eating from soft dishes—as, for instance, puddings, ice-cream, &c. To manufacturers the improvement is of much importance, as for a given weight, or even less weight, a stronger spoon is produced, while nothing need be added to the cost, either to the purchaser or manufacturer—as, for instance, when the spoon or spoon-bowl is made of metal, which the drawings may be supposed to represent, said bowl may be struck up just as any ordinary spoon-bowl is struck up.

Having thus described my invention, I claim as new and desire to secure by Letters Patent—

1. A spoon-bowl constructed with a returned edge, substantially as specified.

2. A spoon having the margin of its bowl bent outward or extended to form a flange or returned edge, essentially as shown and described.

HENRY NICKOLDS, SR.

Witnesses:
ADOLPHE SHIRLEY,
JOHN R. SHIRLEY.